(12) United States Patent
DeKoning et al.

(10) Patent No.: US 6,757,753 B1
(45) Date of Patent: Jun. 29, 2004

(54) UNIFORM ROUTING OF STORAGE ACCESS REQUESTS THROUGH REDUNDANT ARRAY CONTROLLERS

(75) Inventors: Rodney A. DeKoning, Augusta, KS (US); Bret S. Weber, Wichita, KS (US)

(73) Assignee: LSI Logic Corporation, Milpitas, CA (US)

( * ) Notice: Subject to any disclaimer, the term of this patent is extended or adjusted under 35 U.S.C. 154(b) by 260 days.

(21) Appl. No.: 09/875,475

(22) Filed: Jun. 6, 2001

(51) Int. Cl.[7] .................................................. G06F 3/00
(52) U.S. Cl. ............................................. 710/38; 710/36
(58) Field of Search ............................. 710/20, 21, 36, 710/242, 38; 711/100, 101, 111, 114, 117, 112

(56) References Cited

U.S. PATENT DOCUMENTS

| | | |
|---|---|---|
| 4,173,713 A | 11/1979 | Giesken et al. |
| 5,206,939 A | 4/1993 | Yanai et al. |
| 5,394,532 A | 2/1995 | Belsan |
| 5,396,596 A | 3/1995 | Hashemi et al. |
| 5,519,694 A | 5/1996 | Brewer et al. |
| 5,606,359 A | 2/1997 | Youden et al. |
| 5,675,579 A | 10/1997 | Watson et al. |
| 5,694,121 A | 12/1997 | Krause et al. |
| 5,710,549 A | 1/1998 | Horst et al. |
| 5,943,287 A | 8/1999 | Walton |
| 6,023,780 A | 2/2000 | Iwatani |
| 6,148,414 A | 11/2000 | Brown et al. |
| 6,195,770 B1 | 2/2001 | Walton |
| 6,230,221 B1 | 5/2001 | Mulvey et al. |
| 6,289,401 B1 | 9/2001 | Tuccio et al. |
| 6,385,681 B1 | 5/2002 | Fujimoto et al. |
| 6,389,494 B1 | 5/2002 | Walton et al. |
| 6,397,281 B1 | 5/2002 | MacLellan et al. |
| 6,418,511 B1 | 7/2002 | Zani et al. |
| 6,571,310 B1 | 5/2003 | Ottesen et al. |
| 2001/0049773 A1 * | 12/2001 | Bhavsar ...................... 711/147 |

OTHER PUBLICATIONS

Patterson, David A.; "Computer Architecture A Quantitative Approach", Published 1990, ISBN 1–55860329 8; pp. 521–525 and 573; Morgan Kaufmann Publishers, Inc., San Francisco, CA.
Liebhart, Manfred et al.; "A Study of an SCI Swicth Fabric", 1997 IEEE, pp. 162–169.
Peterson, Michael; "Storage Area Networking", Network Buyer's Guide; http://www.sresearch.com/search/105527.htm pp. 1–7.
Jander, Mary; "Launching a Storage–Area Net"; Data Communications, Mar. 21, 1998; pp. 64–72.
Gibson, Garth, et al. "An Introduction to Network–Attached Storage Devices: CMU'S Perspective"; Mar. 5, 1998; Carnegie Mellon Parallel Data Laboratory, pp. 1–10.
Anderson, Dave, "Network Attached Storage Research", Seagate Technology; pp. 1–6.
Farley, Marc, "Avoiding Dead Ends in Storage Networking Through the Use of Storage Routing", Storage Networking Industry Association, Oct. 16, 1997, San Francisco, CA.

* cited by examiner

*Primary Examiner*—Jeffrey Gaffin
*Assistant Examiner*—David Martinez
(74) *Attorney, Agent, or Firm*—Duft, Setter, Ollila & Bornsen, LLC

(57) ABSTRACT

Devices (e.g. "servers") in a data storage system access data contained in logical volumes contained in a plurality of storage devices or storage arrays. The servers issue access requests through any available transfer path from the servers to the storage devices or storage arrays. I/O (input/output) devices control access between the servers and devices that control access to the data (e.g. "array controllers"), so that the access requests from the servers are uniformly routed to the preferred array controllers independently of the transfer paths through which the servers issue the access requests.

11 Claims, 6 Drawing Sheets

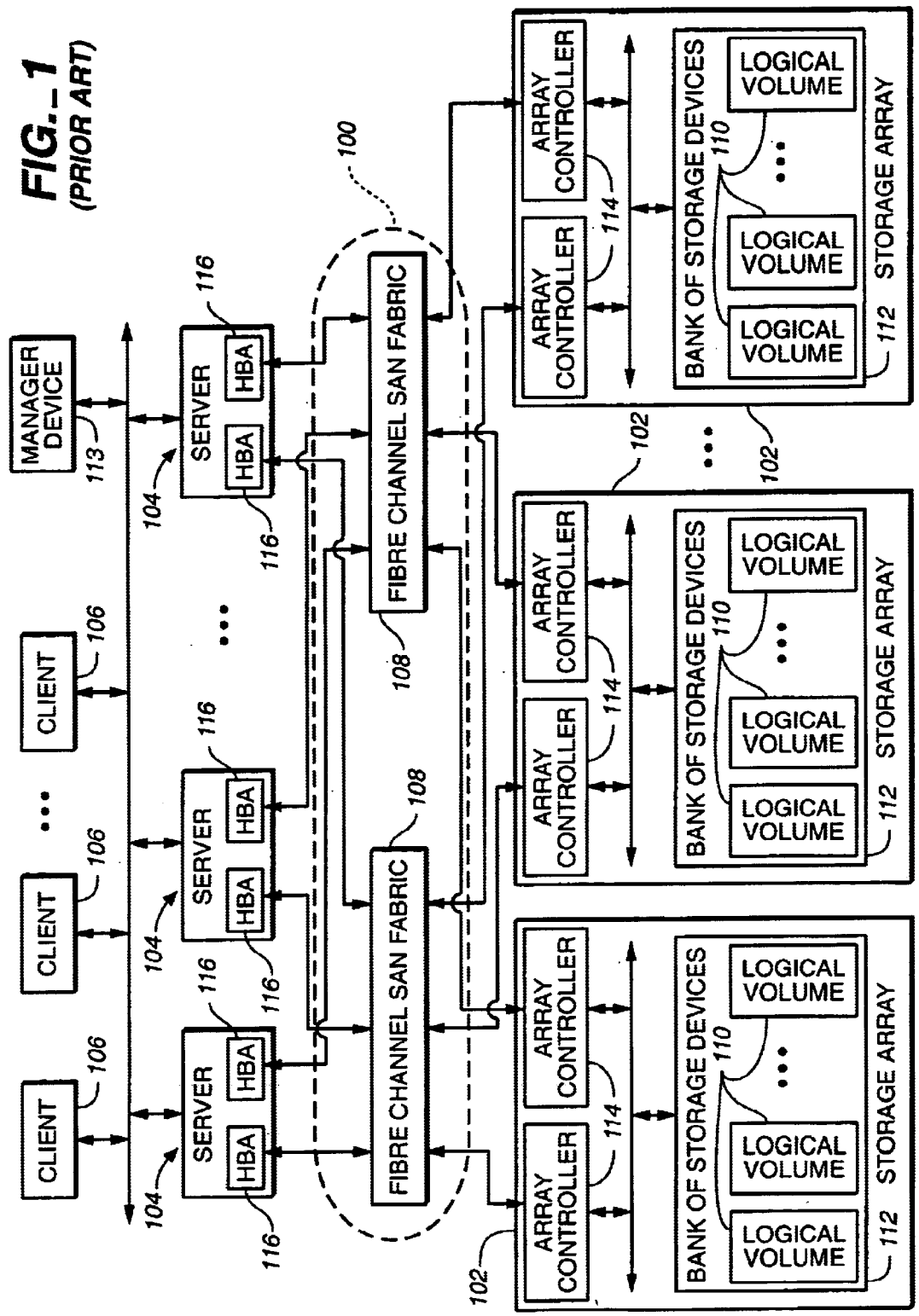
FIG._1 (PRIOR ART)

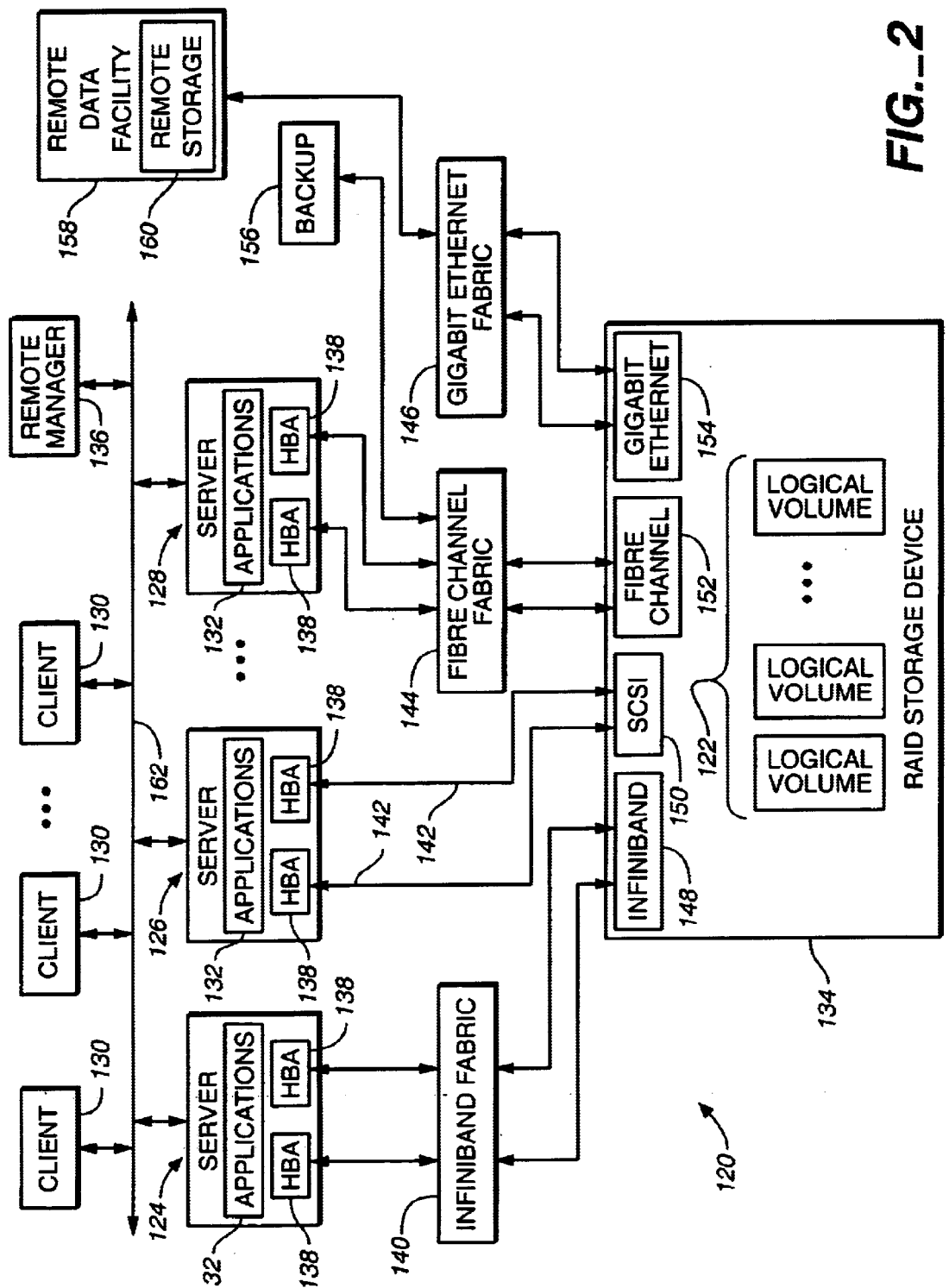
FIG._2

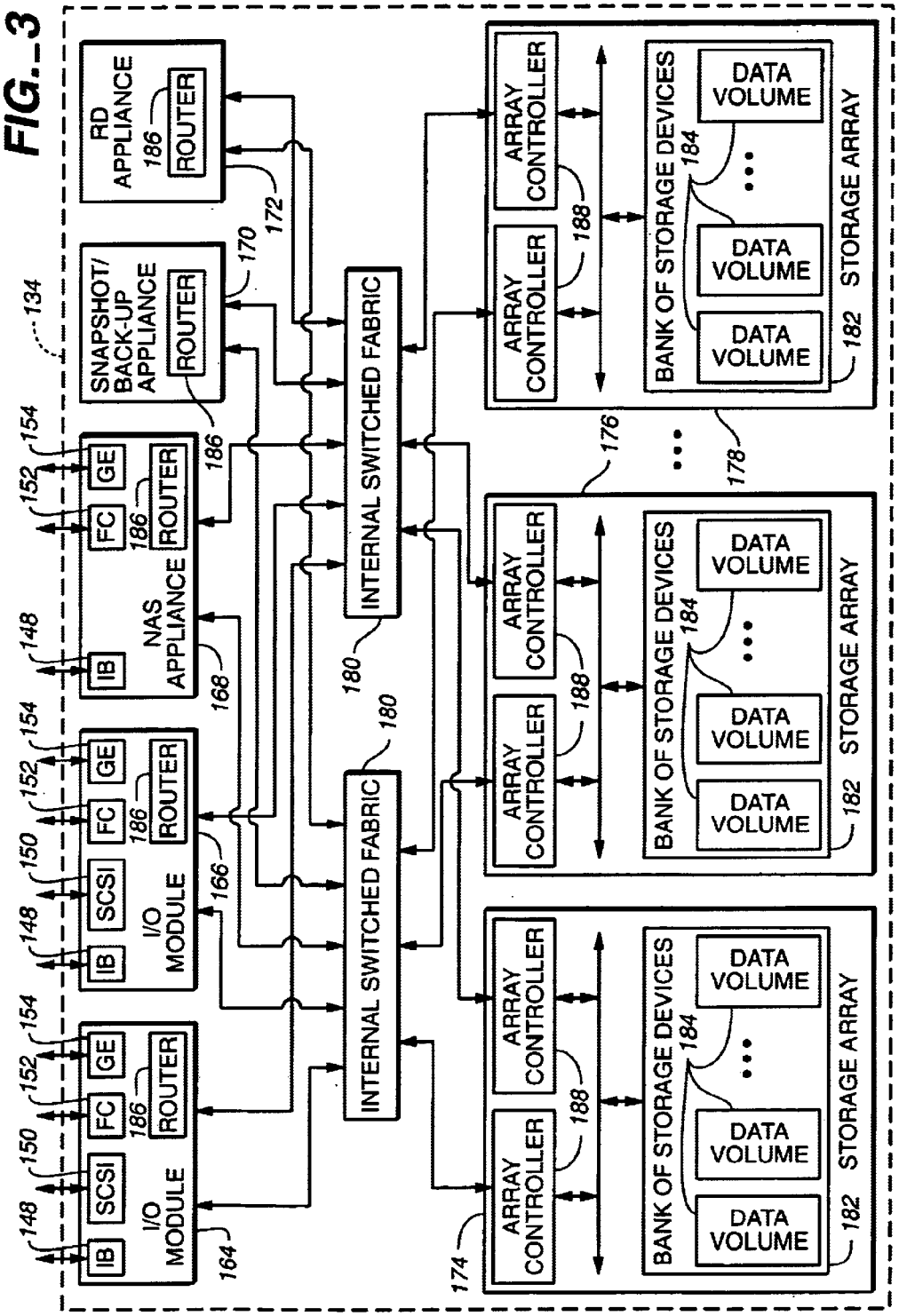
FIG._3

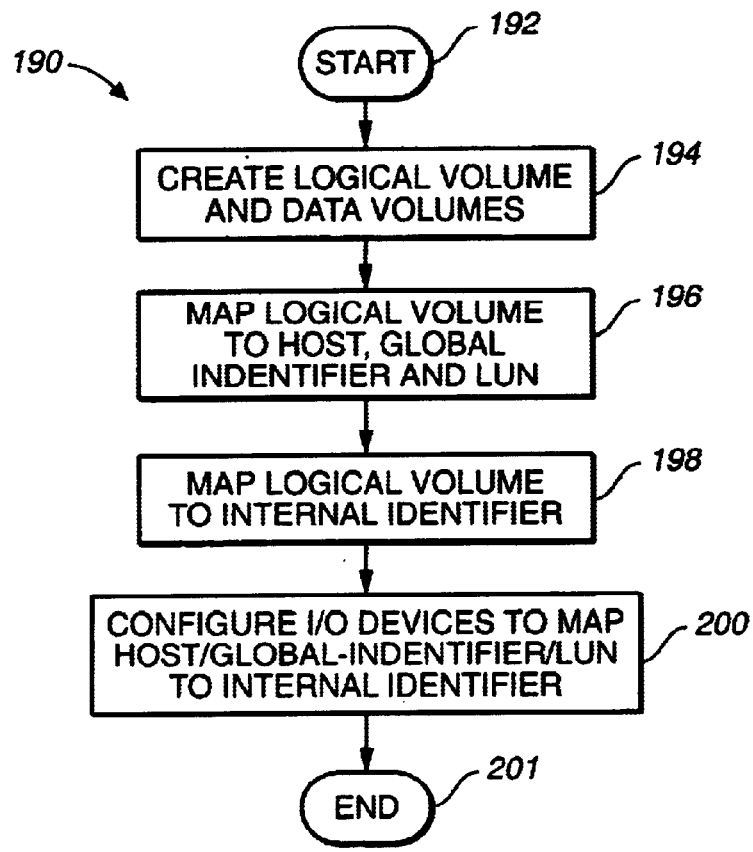
FIG._4
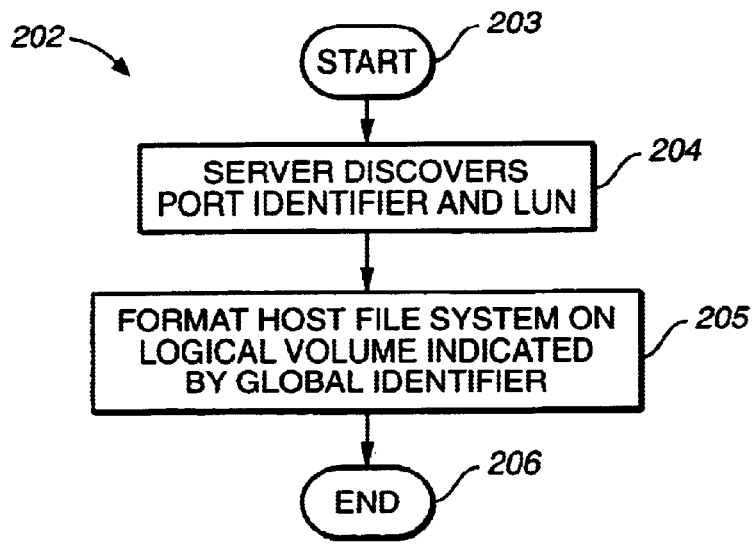
FIG._5

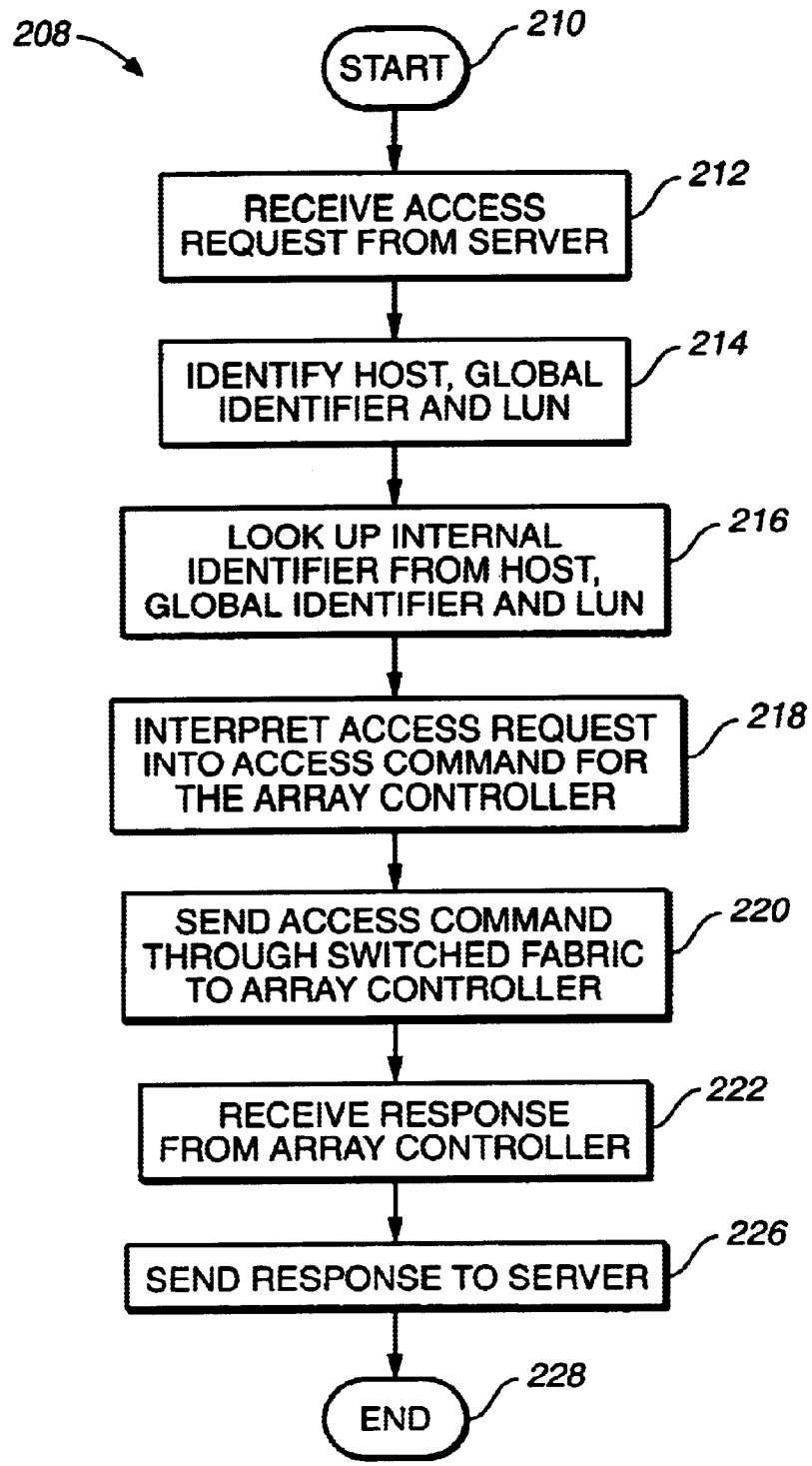
FIG._6

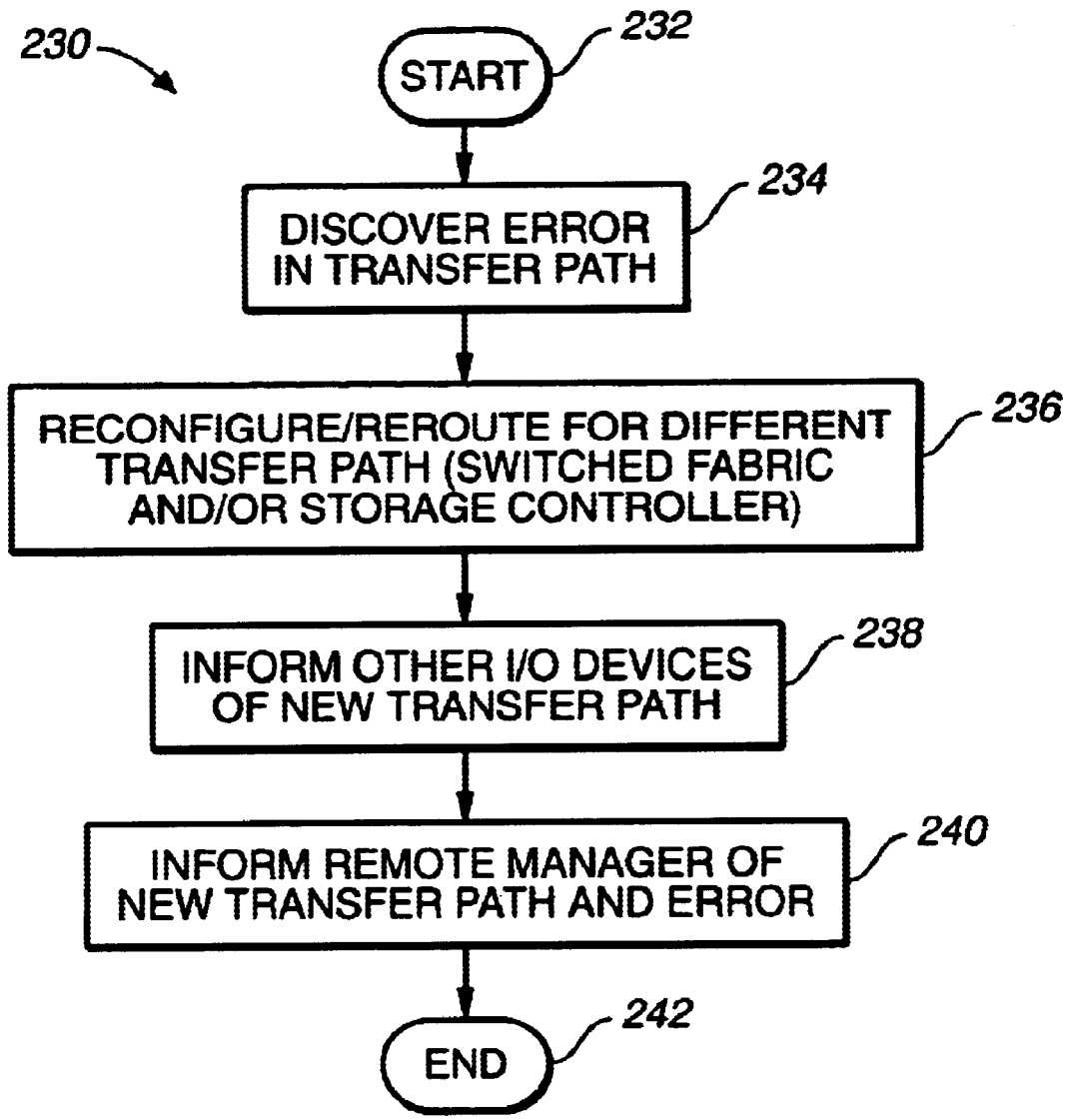
FIG._7

UNIFORM ROUTING OF STORAGE ACCESS REQUESTS THROUGH REDUNDANT ARRAY CONTROLLERS

CROSS-REFERENCE TO RELATED INVENTION

This invention is related to an invention described in U.S. patent application Ser. No. 09/874,515 for "Uniform Routing of Storage Access Requests through Redundant Array Controllers," filed on Jun. 6, 2001. This application is incorporated herein by the reference. This invention is also related to an invention described in commonly owned and co-pending U.S. patent application Ser. No. 09/607,300 for "Methods and Structures For An Extensible RAID Storage Architecture," filed on Jun. 30, 2000.

FIELD OF THE INVENTION

This invention relates to data storage in a computerized storage system, such as a storage area network (SAN). More particularly, the present invention relates to a new and improved technique of handling data access requests within the storage system in such a manner that the devices that issue the requests (e.g. "servers") have improved flexibility in selecting the path through which to send the requests without adversely affecting the ability of the devices that receive the requests (e.g. "storage arrays") to respond to the requests.

BACKGROUND OF THE INVENTION

Current prior art high-capacity computerized data storage systems, such as the one shown in FIG. 1, typically involve a storage area network (SAN) 100 within which one or more conventional storage arrays 102 store data on behalf of one or more servers 104. The servers 104 typically service data storage requirements of several client devices 106, as shown in FIG. 1. The servers 104 are typically connected through switches or SAN's, such as Fibre Channel (FC) SAN fabrics 108, to the storage arrays 102. The servers 104 access a plurality of logical volumes 110 present on the storage arrays 102 on behalf of the client devices 106.

Each storage array 102 typically includes a bank 112 of individual storage devices (not shown, e.g. hard drives, compact disk (CD) drives, tape drives, etc.), typically arranged in a RAID (Redundant Array of Independent Drives) configuration. The RAID storage devices supply data storage space for the logical volumes 110. The logical volumes 110 are commonly striped across multiple storage devices in the banks 112 of storage devices, and may be striped across multiple storage arrays 102. The servers 104 that access a given logical volume 110 must have a striping definition for the logical volume 110 if the logical volume 110 is striped across multiple storage arrays 102 and must have a connection, or path, to the storage array 102 that contains the logical volume 110, or a portion thereof. A manager device 113 typically sets up the logical volumes 110 and monitors for problems, such as a storage device that has failed or is about to fail. Through a discovery process, the servers 104 typically discover the logical volumes 110 on the storage arrays 102 and the array controllers 114 through which the servers 104 can access the logical volumes 110. The servers 104 are thus configured to use the discovered logical volumes 110.

Each storage array 102 also commonly includes more than one array controller 114, through which the storage devices and logical volumes 110 are accessed. Each array controller 114 typically connects to one of the switched fabrics 108. Thus, a data transfer path between one of the servers 104 and one of the array controllers 114 in one of the storage arrays 102 is established from a host bus adapter (HBA) 116 in the server 104, through the switched fabric 108 (to which the host bus adapter 116 is attached), and to the array controller 114 (to which the switched fabric 108 is attached).

Some of the servers 104 may access the same logical volume 110 through more than one data transfer path through the switched fabrics 108 on behalf of the same or different client devices 106. Therefore, more than one array controller 114 of a storage array 102 may receive a data access request to the same logical volume 110, or portion thereof, present on the storage array 102.

When one of the array controllers 114 of a given storage array 102 processes a data access request to a given logical volume 110, that array controller 114 is said to have access control or "ownership" of the logical volume 110. When one array controller 114 has ownership of the logical volume 110, no other array controller 114 in the storage array 102 can access the logical volume 110 without transferring ownership to itself, due to cache coherency issues.

When an array controller 114 receives a data access request to a logical volume 110 that the array controller 114 does not currently own, it transfers ownership of the logical volume 110 to itself in an automatic volume transfer (AVT) process and then processes the data access request. Upon transfer of ownership, the array controller 114 giving up ownership typically must "flush" cached data to the storage devices, so the array controller 114 that is receiving ownership will have the correct, up-to-date data in the storage devices. The time required to perform the cache flush, however, degrades the overall performance of the storage array 102. Additionally, the data access request issued by the server 104 may "timeout" causing the server 104 to erroneously determine that the array controller 114 is not operating if the cache flush takes too much time. Furthermore, when the same logical volume 110 is repeatedly accessed through different array controllers 114, then the array controllers 114 repetitively transfer ownership of the logical volume 110 back and forth between themselves. The repetitive ownership transferring is called "thrashing." Thrashing can severely degrade the performance of data accesses to the affected logical volume 110, since significant time is taken up performing the AVT processes instead of accessing the affected logical volume 110.

When the servers 104 access the same logical volume 110 through the same common array controller 114, then thrashing and unnecessary AVT processes are avoided, because the common array controller 114 can process all of the data access requests. However, it is sometimes advantageous for one or more of the servers 104 to switch between its host bus adapters 116 for accessing the same logical volume 110, even when no array controller 114 has failed. In this manner, the servers 104 can optimize the use of their host bus adapters 116, but at the expense of thrashing between the array controllers 114, since the host bus adapters 116 are connected to the storage array 102 through different data transfer paths.

Additionally, the servers 104 must be able to discover the logical volumes 110 to be able to configure themselves and to route the data access requests to the appropriate array controllers 114. As the size of the SAN 100 and the number of the storage arrays 102 increases, however, the complexity of the tasks of the servers 104 increases significantly.

Furthermore, whenever a new storage array 102 or storage device is added to (or deleted from) the SAN 100 or whenever the distribution of a logical volume 110 across the banks 112 of storage devices or across the storage arrays 102 is changed, the servers 104 must be reconfigured with respect to volume ownership to handle the changes. The reconfiguration takes time away from handling data access requests by the servers and becomes considerably more complex as the number of storage arrays 102 increases.

It is with respect to these and other background considerations that the present invention has evolved.

SUMMARY OF THE INVENTION

The present invention enables servers in a storage system to issue data access requests through different data transfer paths without causing ownership of the logical volumes to thrash back and forth between controllers of a storage array. Thus, the flexibility of the performance of the servers is increased without sacrificing the performance of the controllers.

In accordance with these features, routing capabilities are included in I/O (input/output) modules that control access to the storage devices. The routing capabilities are also preferably included in other types of devices (e.g. intelligent storage hubs, network attached storage appliances, snapshot/backup appliances, remote data appliances, etc.) that control access to the storage arrays.

The I/O modules (or other routing-capability devices) receive the data access requests from the servers and, independently of the data transfer path through which the servers sent the requests, the I/O modules route the data access requests to the appropriate switched fabrics and to the appropriate controllers in the storage arrays.

The servers are also configured with information regarding which host bus adapters and data transfer paths the servers can use to send the data access requests to the logical volume. The servers preferably select a preferred path to a preferred I/O module when sending the data access request, but can typically switch to another path and I/O module when necessary to normalize the loading on the host bus adapters and increase the overall data transfer bandwidth. The selection of any path, however, has no effect on and is made without regard to the controller that will handle the response to the access request at the storage arrays.

The I/O modules are preferably configured with information by which the global identifiers are "mapped" to a "local identifier" for the complete description of the logical volumes, so that the I/O modules can distribute the data access requests to the correct array controllers that have control over those logical volumes. The I/O modules are also preferably configured with information indicating which controller in each storage array currently has "ownership" of the logical data volumes, so that the I/O modules can route the data access requests to the current owner controller and avoid unnecessary ownership transfers, regardless of the data transfer path selected by the servers. Thus, the I/O module receives an access request directed by a server to a logical volume whose physical location or distribution is unknown to the server. The I/O module distributes the access request to the relevant controller, receives back a response from the controller and sends the response to the server.

A more complete appreciation of the present invention and its scope, and the manner in which it achieves the above noted improvements, can be obtained by reference to the following detailed description of presently preferred embodiments of the invention taken in connection with the accompanying drawings, which are briefly summarized below, and the appended claims.

BRIEF DESCRIPTION OF THE DRAWINGS

FIG. 1 is a block diagram of a prior art data storage system.

FIG. 2 is a block diagram of a data storage system incorporating the present invention.

FIG. 3 is a block diagram of a RAID (Redundant Array of Independent Drives) storage device incorporated within the storage system shown in FIG. 2.

FIG. 4 is a flowchart for a procedure for setting up a logical volume within the RAID storage device shown in FIG. 3 to be used by the storage system shown in FIG. 2.

FIG. 5 is a flowchart for a procedure for configuring the storage system shown in FIG. 2 to use the logical volume set up in FIG. 4.

FIG. 6 is a flowchart for a procedure for the RAID storage device shown in FIG. 3 to handle a data access request.

FIG. 7 is a flowchart for a procedure for the RAID storage device shown in FIG. 3 to handle an error situation transparent to the rest of the storage system shown in FIG. 2.

DETAILED DESCRIPTION

A data storage system 120 shown in FIG. 2, such as a storage area network (SAN), generally includes logical volumes 122 that are accessed by one or more conventional servers 124, 126 and 128. Typically, the servers 124–128 issue the access requests on behalf of one or more conventional client devices 130 or applications 132 running on the servers 124–128. The servers 124–128 utilize the logical volumes 122 to store data for the applications 132 or the client devices 130. The logical volumes 122 are contained in a RAID (Redundant Array of Independent Drives) storage device 134, described in more detail below. However, the RAID storage device 134 actually includes a variety of separate routing devices, controllers and storage devices (e.g. conventional hard drives, tape drives, compact disk drives, etc.), described below.

The servers 124–128 issue data access requests, on behalf of the client devices 130 or applications 132, to the RAID storage device 134 for access to the logical volumes 122. The RAID storage device 134 "uniformly" reroutes the access requests to the preferred destinations therein, so the servers 124–128 can choose to send the access requests through any available transfer paths, while the RAID storage device 134 ensures that the access requests are consistently distributed to a preferred destination independently of the chosen transfer paths.

A remote manager 136 creates and manages the logical volumes 122 on the RAID storage device 134 and labels each logical volume with a unique "port identifier" and "logical unit number" (LUN), which combined define a "global identifier." For each logical volume 122 that each server 124–128 uses, the server 124–128 discovers the logical volume 122 on the RAID storage device 134 and configures itself with the global identifier. The global identifier is a unique identifier (e.g. number) that identifies the logical volume 122 and the port, or channel, of the RAID storage device 134 through which the logical volume 122 can be accessed. More than one global identifier may be used to identify the logical volume 122, so that the logical volume 122 can be accessed through more than one port or channel. In this manner, the logical volume 122 is identified outside of the RAID storage device 134 as a single volume associated with the server(s) 124–128 that can access the logical volume 122 and with the data transfer paths, or channels, through which the server 124–128 can access the logical volume 122. The data transfer paths typically extend through a conventional host bus adapter (HBA) 138 in the server 124–128, through a conventional network, or SAN, fabric (e.g. InfiniBand fabric 140, Small Computer System Interface "SCSI" busses 142, Fibre Channel fabric 144 or Gigabit Ethernet fabric 146) and to an appropriate conventional network interface (e.g. InfiniBand interface 148, SCSI interface 150, Fibre Channel interface 152 or Gigabit Ethernet interface 154) in the RAID storage device 134.

Within the RAID storage device 134, the global identifier (i.e. port identifier and LUN) is "mapped" to a "local identifier." The local identifier identifies the array controller, described below, within the storage array, that has control over the logical volume 122 contained within the storage devices of the storage array. In this manner, the function of the servers 124–128 to issue an access request is simplified, since the servers 124–128 reference only the global identifier in the access request and send the access request through the data transfer path from the server 124–128 to the RAID storage device 134 according to the port identifier associated with the global identifier. If more than one global identifier is associated with the logical volume 122, then the servers 124–128 have a selection of available data transfer paths. Regardless of which global identifier is used by the servers 124–128, the RAID storage device 134 assumes the task of sending the access request to the appropriate device (e.g. array controller) and returning the response to the server 124–128. Additionally, the flexibility of the servers 124–128 in issuing an access request is enhanced, since the servers 124–128 can use any available data transfer path from the server 124–128 to the RAID storage device 134, independently of the physical components (e.g. the array controllers) within the RAID storage device 134 that will receive and handle the access request. Likewise, the RAID storage device 134 can respond to the access request independently of the data transfer path selected by the server 124–128, except to ensure that the response returns through the same path. In this manner, the servers 124–128 can maximize the data throughput or bandwidth through the host bus adapters 138 by alternating access requests between the host bus adapters 138 or using whichever host bus adapter 138 is available.

In addition to the servers 124–128, the RAID storage device 134 may interact with other storage-related devices and systems, such as a backup storage system 156 and a remote data facility 158. The backup storage system 156 typically contains a copy of the data from some or all of the logical volumes 122 made at a particular point in time, so the data can be restored in the event of loss of the original data in the logical volumes 122. The remote data facility 158 maintains a copy of the data from some or all of the logical volumes 122 in a geographically remote storage 160, so that the remote data facility 158 can be used for data storage in place of the data storage system 120 in the event of a catastrophic failure of the data storage system 120, such as due to an earthquake, flood, etc.

The remote manager 136 is shown connected to the servers 124–128 through a communication system, such as a local area network (LAN) 162, along with the client devices 130. In this configuration, the remote manager 136 passes instructions to the RAID storage device 134 through the data transfer capabilities of the servers 124–128. However, the remote manager 136 may alternatively be connected at any point, such as directly to one of the servers 124–128 or at one of the SAN fabrics 140–146 or at the RAID storage device 134, or the remote manager 136 may be incorporated into one of the servers 124–128.

The RAID storage device 134, as shown in FIG. 3, includes a variety of I/O devices (e.g. I/O modules 164 and 166, network attached storage "NAS" appliance 168, snapshot/backup appliance 170 and remote data "RD" appliance 172) and several storage arrays 174, 176 and 178 connected together through one or more internal private switched fabrics 180, such as a Fibre Channel switched network, that is "hidden" from the servers 104 (FIG. 2). The RAID storage device 134 contains the data for the logical volumes 122 (FIG. 2) in banks 182 of storage devices (not shown) that contain one or more physical data volumes 184. The data volumes 184 in the storage arrays 174–178 are the components of the logical volumes 122 in the RAID storage device 134 (FIG. 2). Each logical volume 122 may be distributed among more than one data volume 184.

The servers 124–128 (FIG. 2) send the access requests to one of the I/O modules 164 or 166, which routes by means of a router 186 included therein, the access requests through the switched fabrics 180 to array controllers 188 in the storage arrays 174–178. The array controllers 188 control access to the data in the data volumes 184 in the banks 182 of storage devices, so the array controllers 188 write data to and read data from the storage devices in response to the access requests. The array controllers 188 also return responses to the access requests through the switched fabrics 180 to the I/O modules 164 and 166.

Since one logical volume 122 (FIG. 2) may be made of more than one physical data volume 184 on one storage array 174–178, an access request from a server 124–128 (FIG. 2) directed to a logical volume 122 may be interpreted, or converted, by the receiving I/O module 164 or 166 into "sub" access requests, or actual data access commands, directed to the individual data volumes 184. The I/O module 164 or 166 sends the access commands to the array controller 188 in the storage array 174–178 that has control over the data volumes 184 that make up the logical volume 122. The array controller 188 responds to the access request. Afterwards, the I/O module 164 or 166 sends the response from the array controller 188 back to the server 124–128. The actual processing of the access request is, thus, "transparent" to the server 124–128.

The I/O modules 164 and 166 preferably include a variety of the network interfaces 148–154 (see also FIG. 2) which connect to the SAN fabrics 140–146 (FIG. 2). Therefore, the servers 124–128 (FIG. 2) use a conventional transfer protocol determined by the type of SAN fabric 140–146 to which they are attached. The I/O modules 164 and 166, however, convert the transfer protocol used by the servers 124–128 into the transfer protocol (e.g. Fibre Channel) that is used within the RAID storage device 134. In this manner, the data storage system 120 (FIG. 2) enables the additional flexibility of allowing the servers 124–128 to use a variety of transfer protocols and SAN fabrics 140–146, including, but not limited to, file-level and block-level transfer protocols.

Additionally, each I/O module 164 and 166 preferably includes the same set of network interfaces 148–154, so multiple data transfer paths can be established from any server 124–128 through the connected SAN fabric 140–146 to any I/O module 164 or 166. Thus, each server 124–128 can make use of both of the host bus adapters 138 (FIG. 2) contained therein to send access requests to the RAID storage device 134. In this manner, the servers 124–128 can maximize their data transfer capability.

The I/O modules 164 and 166 are configured with information, in accord with the local identifier, identifying the same array controller 188 to receive the access commands sent from the I/O modules 164 and 166, i.e. the array controller 188 that has control over the relevant data volumes 184 in the storage array 174178. Therefore, the I/O modules 164 and 166 distribute the access commands to the same array controller 188 for each data volume 184. In this manner, unnecessary transfer of control, or ownership, of the data volumes 184 between the array controllers 188 (i.e. "thrashing") is avoided.

The NAS appliance 168, the snapshot/backup appliance 170 and the RD appliance 172 also each include one of the routers 186 for routing capabilities similar to those described above for the I/O modules 164 and 166. The NAS appliance 168 may include a set of the network interfaces 148,152 and 154 for connecting through the SAN fabrics 140, 144 and 146 (FIG. 2) to a variety of devices (not shown) that require conventional "file level" data storage, as opposed to conventional "block level" data storage supplied by the I/O modules 164 and 166. Alternatively, the NAS appliance 168 may not have any of the network interfaces 148, 152 or 154, but may access the variety of devices through the switched fabrics 180 and the I/O modules 164 and 166.

The snapshot/backup appliance 170 communicates with the storage arrays 174–178 through the internal switched fabrics 180 and with the backup storage system 156 (FIG. 2) through the internal switched fabrics 180 and the I/O modules 164 and 166. The snapshot/backup appliance 170 preferably forms a conventional "snapshot" of the data volumes 184 in the storage arrays 174–178 in order to copy, or backup, the data volumes 184 to the backup storage system 156. With the backup data (not shown), the data volumes 184 can be restored in the event of loss of data.

The RD appliance 172 communicates with the remote data facility 158 (FIG. 2) through the internal switched fabrics 180 and the I/O modules 164 and 166. The RD appliance 172 maintains a mirrored copy of the data volumes 184 in the remote storage 160 (FIG. 2), so that the remote data facility 158 can take over data storage requirements for the client devices 130 in the event of a failure of the data storage system 120 (FIG. 2), such as a power failure.

In each of the appliances 168,170 and 172, the routing functions of the router 186 distribute the access commands to the array controllers 188 that have control over the relevant data volumes 184, so the connected devices (the backup storage system 156 and the remote data facility 158) do not need to have information regarding the individual data volumes 184.

The remote manager 136 (FIG. 2) controls the creation of the data volumes 184 (FIG. 3) and the logical volumes 122 (FIG. 2) and the configuration of the I/O devices 164–172 (FIG. 3) according to a procedure 190 shown in FIG. 4. The procedure 190 starts at step 192. At step 194, the logical volume 122 is created with its component data volumes 184. The storage space is set aside, or reserved, in the storage devices (not shown) in the storage arrays 174–178 (FIG. 3) for the data volumes 184 that make up the logical volume 122.

The logical volume 122 (FIG. 2) is mapped (step 196) to a server, global identifier, LUN combination. The server 124–128 (FIG. 2) is one which will issue the access requests to the logical volume. The global identifier identifies the logical volume 122 to the server 124–128. The logical volume 122 is also mapped (step 198) to the internal identifier, a logical unit number that identifies the logical volume 122 and its component data volumes 184 (FIG. 3) and actual storage arrays 174–178 (FIG. 3) and storage devices that make up the logical volume 122.

The I/O devices 164–172 (FIG. 3) that are to use, or have access to, the logical volume 122 (FIG. 2) are configured (step 200) to map the server, global identifier and LUN combination to the internal identifier. With this configuration (e.g. a routing table), the I/O modules 164 and 166 can interpret, or convert, the access requests received from the server 124–128 (FIG. 2) into the specific access commands to the owning array controllers 188 (FIG. 3) that have control over the relevant data volumes 184 (FIG. 3). The appliances 168–172 can do similarly for the backup storage system 156 (FIG. 2), the remote data facility 158 (FIG. 2) or other device (not shown). The procedure 190 ends at step 201.

The servers 124–128 (FIG. 2) configure themselves to use the logical volumes 122 (FIG. 2) according to a procedure 202 shown in FIG. 5. The procedure 202 starts at step 203. The server 124–128 discovers (step 204) the port identifier and LUN (i.e. the global identifier) by conventional discovery software that queries the I/O modules 164 and 166 (FIG. 3) for the logical volumes 122. The host file system (not shown) of the server 124–128 is formatted (step 205) on the target logical volumes 122 indicated by the global identifier. The data storage system 120 (FIG. 2) is then ready to begin servicing access requests from the server 124–128 to the RAID storage device 134 (FIGS. 2 and 3). The procedure 202 ends at step 206.

When one of the servers 124–128 (FIG. 2) issues an access request to one of the I/O modules 164 or 166 (FIG. 3) directed to one of the logical volumes 122 (FIG. 2), the I/O module 164 or 166 responds according to a procedure 208 shown in FIG. 6. The procedure 208 starts at step 210. At step 212, the access request is received from the server 124–128. The server, global identifier and LUN combination is identified at step 214 from the access request, since the server 124–128 includes this information in the access request. The server, global identifier and LUN combination is used to look up (step 216) the internal identifier for the logical volume 122. The array controller 188 (FIG. 3) that currently has control over the logical volume 122 is also identified at step 216.

The access request received from the server 124–128 (FIG. 2) is interpreted, or converted, (step 218) into the access command for the array controller 188 (FIG. 3) that has control over the logical volume 122 (FIG. 2). The access command is sent (step 220) through the switched fabric 180 (FIG. 3) to the array controller 188. The array controller 188 and storage devices respond in a conventional manner to carry out the access request, and the response is received (step 222) back from the array controller 188. The response is sent (step 226) to the server 124–128. The procedure 208 ends at step 228.

The NAS appliance 168 (FIG. 3) responds in a similar manner to that described above with reference to FIG. 6 upon receiving a file level access request. The snapshot appliance 170 (FIG. 3) and the RD appliance 172 (FIG. 3) also function similarly, except that they typically do not receive access requests from the backup storage system 156 (FIG. 2) or the remote data facility 158 (FIG. 2), respectively. Instead, the snapshot appliance 170 and the RD appliance 172 internally initiate access requests to perform the snapshot, data backup and remote mirroring functions.

An advantage of the data storage system 120 (FIG. 2) is that certain errors can be detected and corrective measures taken within the RAID storage device 134 (FIGS. 2 and 3) transparent to, or without the involvement of, the servers 124–128 (FIG. 2), so the servers 124–128 can continue to service the data storage requirements of the client devices 130 (FIG. 2) without being interrupted to correct the errors. An exemplary error recovery procedure 230 performed by the I/O devices 164–172 (FIG. 3) is shown in FIG. 7. The procedure 230 starts at step 232. At step 234, the I/O device 164–172 encounters an error when attempting to access the logical volume 122 (FIG. 2) on the storage array 174–178 (FIG. 3) and determines the likely source of the error through conventional error detection techniques. For example, the source of the error may be a component of the internal switched fabric 180 (FIG. 3) through which the I/O device 164–172 sent the access command to the storage array 174–178, the array controller 188 (FIG. 3) of the storage array 174–178 to which the I/O device 164–172 sent the access command, the storage device (not shown) in the storage array 174–178, etc.

The I/O device 164–172 (FIG. 3) is reconfigured (step 236) with information for the local identifier and a different data transfer path, i.e. different switched fabric 108 and/or array controller 188. Thus, the access commands are effectively rerouted for the data volume 184 through the new data transfer path, thereby avoiding the source of the error. The other I/O devices 164–172 are informed (step 238) of the new data transfer path, so the other I/O devices 164–172 can reroute the access commands they receive that are directed to the same data volume 184 and avoid the same error. The remote manager 136 (FIG. 2) is also informed (step 240) of the new data transfer path and of the error, so the system administrator can be notified to take corrective action to replace faulty equipment and/or to prevent the recurrence of the error. The server 124–128, however, is not informed of the changes that took place in the RAID storage device 134, since the internal functioning of the RAID storage device 134 is transparent to the servers 124–128. The procedure 230 ends at step 242.

The above described invention enables flexibility in the creation and management of logical volumes on storage arrays. The above described invention also has the advantage of allowing improved flexibility in operation of the servers 124–128 (FIG. 2) without degrading the performance of the storage arrays 174–178 (FIG. 3) due to the rerouting capabilities of the access requests by the I/O devices 164–172 (FIG. 3). Since the functions, components and architecture within the RAID storage device 134 (FIGS. 2 and 3) are transparent to the servers 124–128, the servers 124–128 are not restricted thereby and have little effect thereon. Therefore, the servers 124–128 may use any available resources, such as the host bus adapters 116 (FIG. 2) and data transfer paths, without respect to the internal configuration of the RAID storage device 134. Likewise, the I/O devices 164–172 uniformly use a preferred resource, such as one of the array controllers 188 (FIG. 3), without respect to the data transfer path selected by the servers 124–128 for a "uniform" routing of the access requests to the array controllers 188.

Presently preferred embodiments of the invention and its improvements have been described with a degree of particularity. This description has been made by way of preferred example. It should be understood that the scope of the present invention is defined by the following claims, and should not be unnecessarily limited by the detailed description of the preferred embodiments set forth above.

The invention claimed is:

1. A method for handling access to data storage in a storage system in which a storage array contains data in a logical volume on behalf of a server, the server sends access requests through a plurality of input/output (I/O) devices to a plurality of array controllers that control access to the storage array and the logical volume, the logical volume is under the control of only one array controller at a time, control of the logical volume can switch between the array controllers, comprising the steps of:

forming an access request at the server for access to the logical volume wherein the request includes a global identifier comprising a logical unit number of the logical volume to which the request is directed;

selecting a first data transfer path from the server to one of the I/O devices, independently of the array controller that has control over the logical volume identified by the logical unit number in the request;

sending the access request through the selected first data transfer path to the one I/O device;

determining a selected one of the array controllers that is to receive the access request, independently of the selected first data transfer path from the server to the one I/O device, wherein the determination is performed based in part on the logical unit number in the request;

selecting a second data transfer path from the one of the I/O devices to one or more of the array controllers through a second network fabric comprising a plurality of available paths within the storage system connecting the I/O devices and the array controllers; and sending the access request from the one I/O device to the selected array controller via the second data transfer path instructing the selected array controller to respond to the access request.

2. A method as defined in claim 1 comprising the further step of:

selecting the array controller that currently has control over the logical volume as the selected array controller.

3. A method as defined in claim 1, comprising the further steps of:

after forming the access request at the server, selecting a third data transfer path, different from the first data transfer path and the second data transfer path, from the server to the one I/O device, independently of the array controller that has control over the logical volume;

sending the access request through the third data transfer path to the one I/O device; and determining the selected array controller that is to receive the access request, independently of the third data transfer path from the server to the one I/O device, before sending the access request from the one I/O device to the selected array controller instructing the selected array controller to respond to the access request.

4. A method as defined in claim 1, wherein the aforesaid selected first data transfer path is one of a plurality of first data transfer paths through a first network fabric connecting the server with the I/O devices, wherein the second data transfer path is one of a plurality of second data transfer paths through the second network fabric connecting the I/O devices and the array controllers through the plurality of second data transfer paths, comprising the further steps of:

selecting the one first data transfer path from among the plurality of first data transfer paths depending on performance capabilities of the server;

sending the access request through the first network fabric through the one first data transfer path from the server to the one I/O device;

selecting the second data transfer path through the second network fabric from the one I/O device to the array controller that has control over the logical volume; and sending the access request through the second data transfer path from the one I/O device to the array controller that has control over the logical volume.

5. A method as defined in claim 1, wherein the storage array contains data in a plurality of the logical volumes on behalf of a plurality of the servers, the array controllers control access to each of the logical volumes, the logical volumes are each under the control of only one array controller at a time, control of each logical volume can switch between the array controllers, the logical volume first aforesaid is a particular one of the plurality of logical volumes, the server first aforesaid is a particular one of the plurality of servers, comprising the further steps of:

creating the particular logical volume among the plurality of logical volumes on the storage array before forming the access request; and associating the particular logical volume with the particular server and the first data transfer path from the particular server to the I/O devices before forming the access request.

6. A method as defined in claim 1, wherein the logical volume is identified to the server with a global identifier that identifies the logical volume, the logical volume is identified to the I/O devices with a local identifier that identifies the logical volume and the array controller that has control over the logical volume, comprising the further steps of:

before forming the access request at the server, configuring the I/O devices to map the global identifier to the local identifier;

including the global identifier in the formed access request at the server;

determining the local identifier from the global identifier at the one I/O device; and using the local identifier to determine the array controller that has control over the logical volume, independently of the selected first data transfer path from the server to the one I/O device.

7. A data storage system comprising:

a storage array configured to form a logical volume, the logical volume containing data;

a plurality of array controllers connected to the storage array to control access to the storage array, the logical volume and the data, the logical volume being under control of only one of the array controllers, control of the logical volume being changeable to another one of the array controllers, the logical volume being associated with a logical unit number;

a server from which access requests are sent to the array controllers through multiple transfer paths for access to the logical volume and the data contained on the logical volume, the access requests each including a global identifier comprising a logical unit number identifying the logical volume to which the request directed, the server being operative to select one of the transfer paths independently of which array controller has control over the logical volume identified by the logical unit number, wherein the aforesaid selected transfer path is one of a plurality of first transfer paths through a first network fabric connecting the server with the I/O devices; and a plurality of input/output (I/O) devices connected between the server and the array controllers and being operative to receive the access requests from the server and further operative to determine which array controller currently has control over the logical volume on the storage array based in part on the logical unit number in each access request and further operative to send the access request to the determined array controller, independently of the transfer path selected by the server; and a second network fabric connecting the I/O devices and the array controllers through a plurality of second transfer paths, wherein the determined array controller receives the access request via one of the second data transfer paths.

8. A data storage system as defined in claim 7 wherein:

the aforesaid selected transfer path is a first transfer path;

the server is further operative to select a third transfer path, different from the first transfer path, through which to access the logical volume and the data contained on the logical volume, independently of the array controller that has control over the logical volume; and the I/O devices are further operative to determine which array controller currently has control over the logical volume on the storage array and to send the access request to the determined array controller, independently of the third transfer path selected by the server.

9. A data storage system as defined in claim 7 wherein:

the server is further operative to select the one first transfer path from among the plurality of first transfer paths depending on performance capabilities of the server; and the I/O devices are further operative to select the one of the second transfer paths through the second network fabric from the I/O devices to the array controller that has control over the logical volume.

10. A data storage system as defined in claim 7 wherein:

the storage array is configured to form a plurality of the logical volumes in which the data is contained on behalf of a plurality of the servers;

the logical volume first aforesaid is a particular one of the plurality of logical volumes and the server first aforesaid is a particular one of the plurality of servers;

the array controllers control access to each of the logical volumes; the logical volumes are each under the control of only one array controller at a time;

control of each logical volume can switch between the array controllers; and the I/O devices and the particular server contain information associating the particular logical volume with the particular server and the selected transfer path.

11. A data storage system as defined in claim 7 wherein:

the server contains a global identifier that identifies the logical volume as a single volume;

the I/O devices contain a local identifier that identifies the storage array that forms the logical volume and the array controller that has control over the logical volume;

the server is further operative to include the global identifier in the access request; and the I/O devices are further operative to map the global identifier to the local identifier and to use the local identifier to determine the array controller that has control over the logical volume, independently of the transfer path selected by the server.

* * * * *